US006305736B1

United States Patent
Enomoto et al.

(10) Patent No.: US 6,305,736 B1
(45) Date of Patent: Oct. 23, 2001

(54) AUTOMOTIVE VEHICLE AUTOMOTIVE FRONT DOOR MOVING STRUCTURE AND AUTOMOTIVE FRONT DOOR WINDOW GLASS LOWERING STRUCTURE

(75) Inventors: Kouji Enomoto; Suguru Yoshida, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/727,546

(22) Filed: Dec. 4, 2000

(30) Foreign Application Priority Data

Dec. 3, 1999 (JP) .................................... 11-345529

(51) Int. Cl.$^7$ ...................................... B60J 1/08
(52) U.S. Cl. ................... 296/146.1; 296/189; 296/146.1
(58) Field of Search ................ 296/146.1, 189, 296/146.11

(56) References Cited

U.S. PATENT DOCUMENTS

| | | | |
|---|---|---|---|
| 3,718,364 | * 2/1973 | Fischer et al. | 296/146.1 |
| 5,044,459 | * 9/1991 | Nishikaji | 180/268 |
| 5,149,135 | * 9/1992 | Konishi et al. | 280/806 |
| 5,417,470 | * 5/1995 | Holt | 296/188 |
| 5,480,181 | * 1/1996 | Bark et al. | 280/730.2 |
| 5,588,672 | * 12/1996 | Karlow et al. | 280/730.2 |
| 5,700,050 | * 12/1997 | Gonas | 296/189 |
| 5,943,295 | * 8/1999 | Varga et al. | 280/735 |
| 6,018,980 | * 2/2000 | Kimura et al. | 73/12.04 |
| 6,095,591 | * 8/2000 | Matsuyama et al. | 296/189 |
| 6,116,696 | * 9/2000 | Widman et al. | 280/808 |
| 6,179,326 | * 1/2001 | Breed et al. | 280/735 |

FOREIGN PATENT DOCUMENTS 9-39833   2/1997  (JP) .

* cited by examiner

Primary Examiner—Joseph D. Pape
Assistant Examiner—Kiran B. Patel
(74) Attorney, Agent, or Firm—Arent Fox Kintner Plotkin & Kahn

(57) ABSTRACT

An automotive vehicle in which a door hinge 64 of a front door 15 can forcibly be moved transversely outwardly of the vehicle, the automotive vehicle comprising an acceleration sensor 57 for detecting an impact applied to a front pillar and a door moving mechanism 52 for forcibly moving the door hinge 64 transversely outwardly of the vehicle, whereby the front door 15 is constructed to be moved transversely outwardly of the vehicle. In the event that an impact is applied to a front pillar, a front door can forcibly be moved transversely outwardly of an automotive vehicle on a side where the door hinge is provided, and in a case where the hinge is disposed in the vicinity of the front pillar, the transversely outward movement of the front door can be made large, whereby the interference of the front pillar with the front door can positively be prevented. Consequently, since the deformation of the front pillar cannot be prevented, the impact applied to the front pillar can effectively be absorbed and reduced.

13 Claims, 16 Drawing Sheets

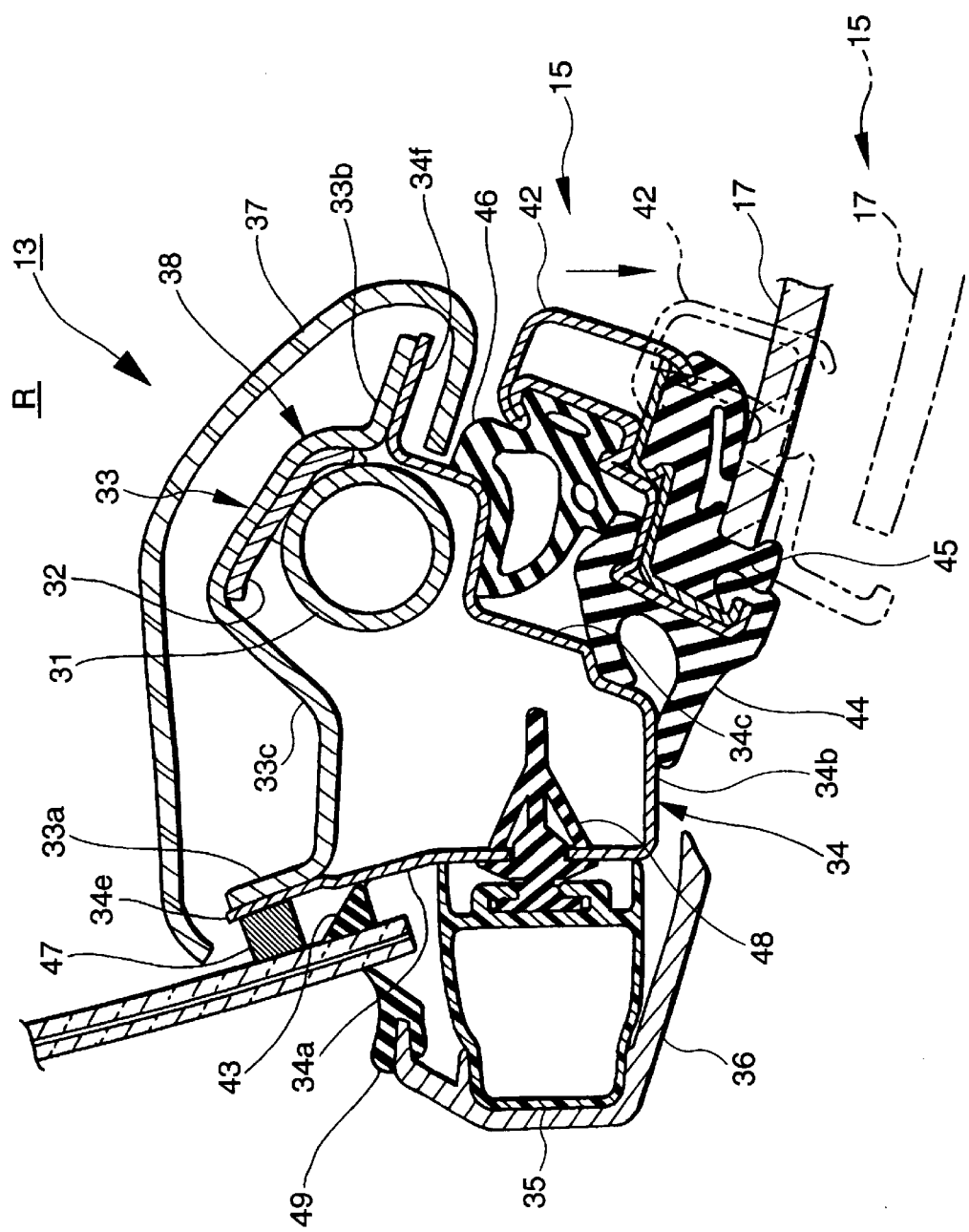

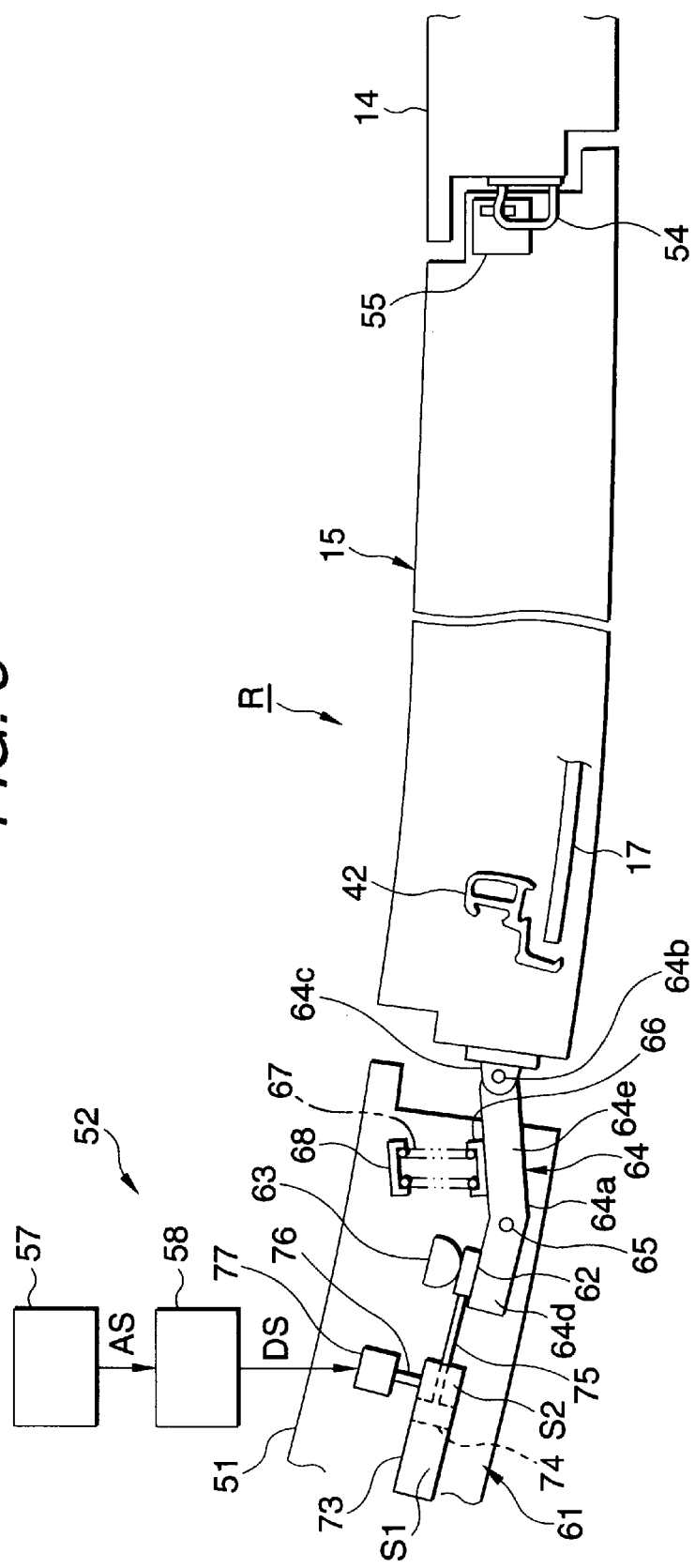

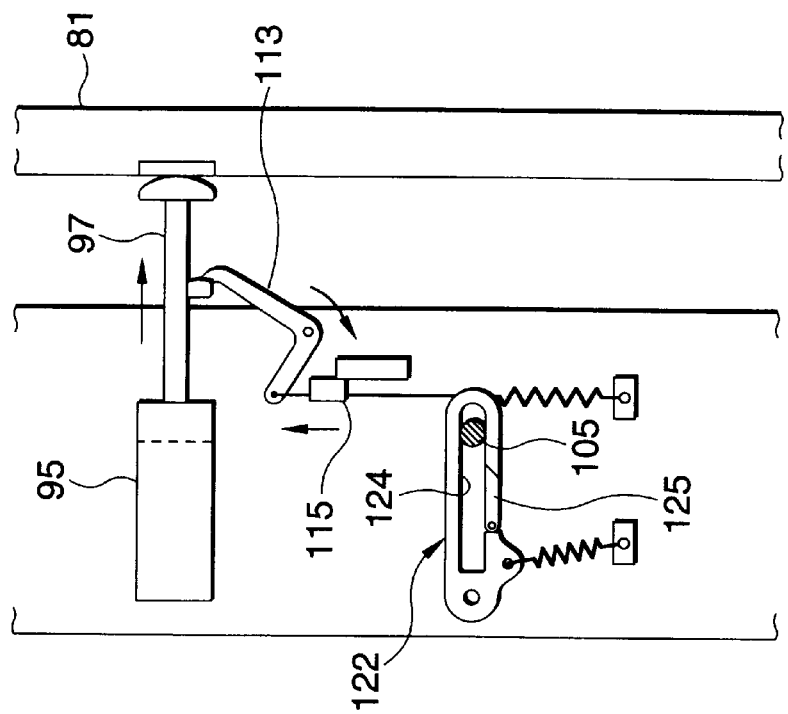
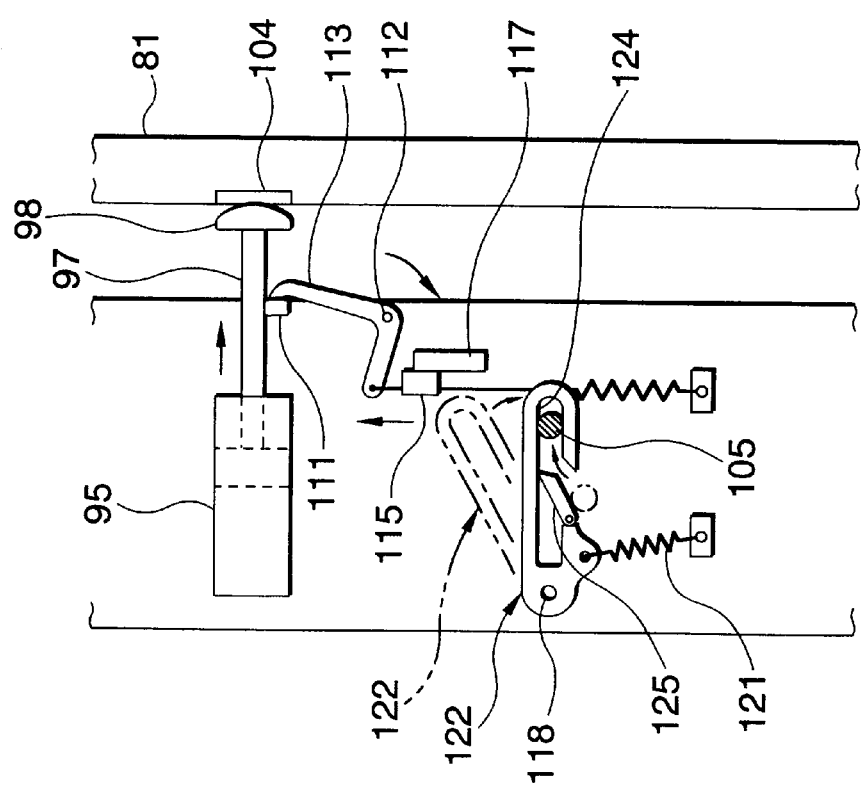
FIG. 10A
FIG. 10B

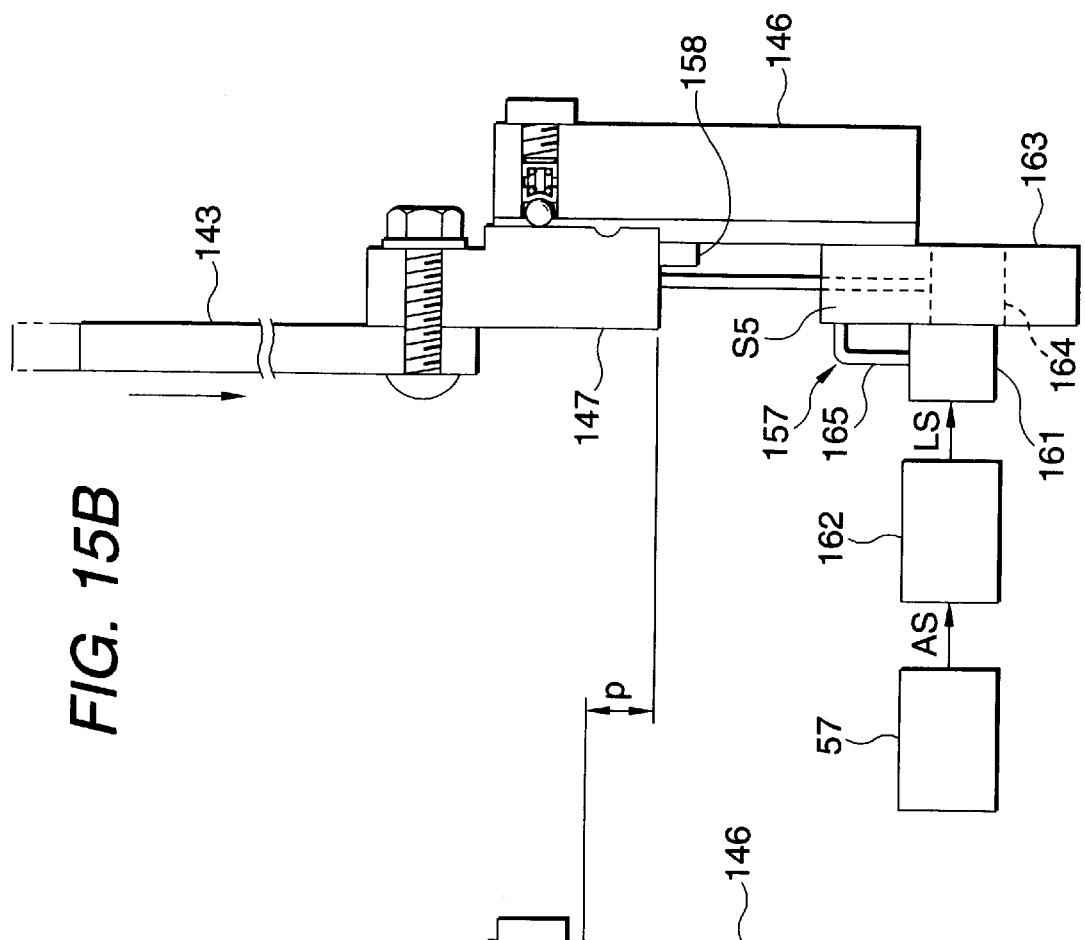
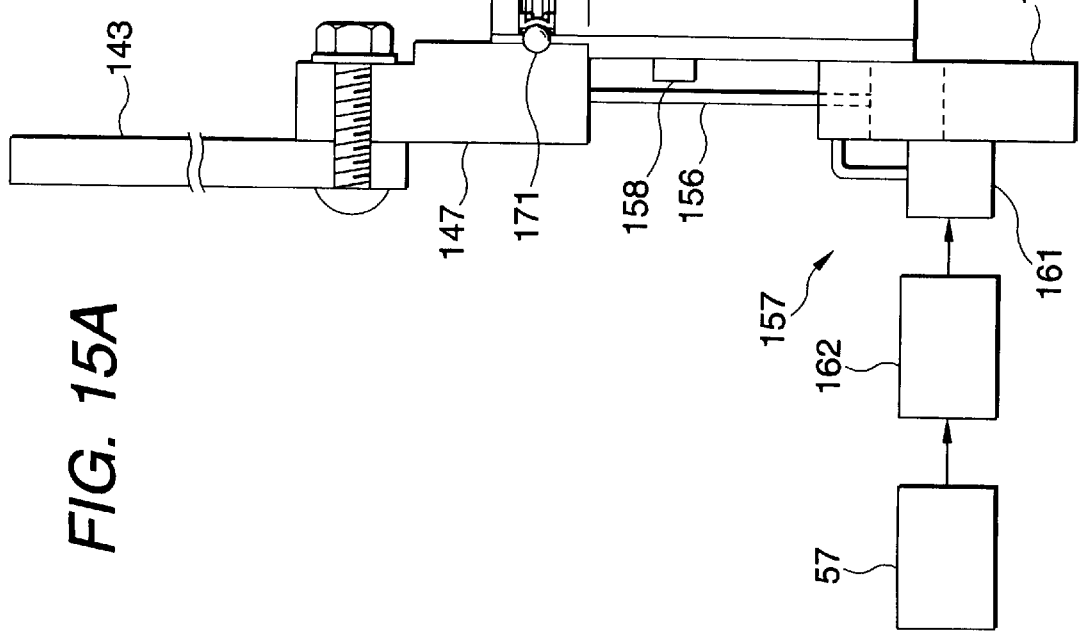
FIG. 15A
FIG. 15B

AUTOMOTIVE VEHICLE AUTOMOTIVE FRONT DOOR MOVING STRUCTURE AND AUTOMOTIVE FRONT DOOR WINDOW GLASS LOWERING STRUCTURE

BACKGROUND OF THE INVENTION

The present invention relates to, an automotive vehicle, an automotive front door moving structure and an automotive front door window glass lowering structure which are adapted to effectively absorb an impact applied to a front pillar.

There is known an automotive front pillar provided with an impact absorbing structure for reducing an impact generated by an object coming into collision with the front pillar of an automotive vehicle through its deformation.

For example, Japanese Patent Unexamined Publication No. Hei.9-39833 entitled an "automotive front pillar" describes such an automotive impact absorbing structure. This technology will be described below with reference to FIG. 18, which corresponds to FIG. 2 of the original publication. Note that new reference numbers will be used in the description FIG. 18 is a cross-sectional view of the prior art automotive front pillar. A front pillar 200 comprises a pillar main body 203 formed into a tube-like body by joining a pillar inner 201 with a pillar outer 202 and a substantially U-shaped impact absorbing panel 204 acting to absorb an impact is attached to the front face of the pillar main body 203 with an opening side thereof being oriented toward the pillar main body 203.

Here, reference numeral 206 is a resin garnish, reference numeral 207 a windshield, reference numeral 208 a sealant, reference numeral 211 a window sash or window frame, reference numerals 212, 213 weatherstrips and reference numeral 214 a front door windowpane or window glass. Note that the weatherstrip 213 and the window glass 214 are purposively added to the original drawing for the sake of explanation.

Referring to FIG. 19, the function of the front pillar 200 will be described.

FIG. 19 is a functional diagram for explaining the function of the prior art front pillar.

When an object C collides against the front pillar 200 from the front of a vehicle, an external force is applied to the impact absorbing panel 204 via the resin garnish 206, whereby the impact absorbing panel 204 is deformed.

This reduces an impact force that is to be transmitted to the pillar main body 203, but, for example, in the event that the impact absorbing panel 204 interferes with the window frame 211 while being deformed, the impact absorbing panel 204 is prevented from being deformed further.

As a result of this, it is conceived that the impact force applied to the impact absorbing panel 204 is not fully absorbed, whereby the impact is transmitted to the pillar main body 203 and the window frame 211.

Additionally, with a door having no window sash or a so-called "frame-less" window, the deformation of the impact absorbing panel 204 is prevented similarly by a window glass (which corresponds to the windowpane 214), and therefore it is predicted that the impact is transmitted to the window glass of the door.

SUMMARY OF THE INVENTION

The present invention was made to cope with this. It is an object of the present invention to provide an automotive vehicle having a structure for effectively absorbing and reducing an impact, which is applied to an automotive front pillar, by preventing the automotive front pillar under deformation interfering with the front door window frame or window glass. In particular, it is an object of the present invention to provide an automotive front door moving structure for effectively absorbing and reducing the impact by preventing the front pillar under deformation interfering with the front door window frame. Further, it is also an object of the present invention to provide an automotive front door window glass lowering structure for effectively absorbing and reducing the impact by preventing the front pillar under deformation interfering with the window glass.

With a view to attaining the object, according to a first aspect of the invention, there is provided an automotive front door moving structure for an automotive vehicle in which a hinge on a front door can forcibly be moved toward the outside of the automotive vehicle, the automotive vehicle comprising an impact detecting unit for detecting an impact applied to a front pillar and a moving mechanism for forcibly moving the hinge toward the outside of the automotive vehicle based on a detection signal from the impact detecting unit, whereby the front door is constructed to be moved toward the outside of the automotive vehicle.

The front door is moved toward the outside of the automotive vehicle by providing the impact detecting unit and the moving mechanism on the vehicle in which the hinge of the front door can forcibly be moved toward the outside thereof, detecting an impact applied to the front pillar with the impact detecting unit and forcibly moving the hinge toward the outside of the vehicle with the moving mechanism based on a detection signal from the impact detecting unit.

As a result of this, in the event that an impact is applied to the front pillar, the front door can forcibly be moved toward the outside of the vehicle on the hinge side thereof, and in a case where the hinge is disposed in the vicinity of the front pillar, the movement of the front door toward the outside of the vehicle can be made larger, whereby the risk of the front pillar interfering with the front door can positively be prevented.

Consequently, since there is no risk of the deformation of the front pillar being prevented, the impact applied to the front pillar can effectively absorbed and reduced.

According to a second aspect of the invention, there is provided an automotive front door moving structure for an automotive vehicle in which a hinge is provided at one end of a front door and a door lock mechanism for connecting the front door to an automotive vehicle side is provided at the other end of the front door, whereby the front door can forcibly be moved toward the outside of the automotive vehicle on a side thereof where the door lock mechanism is provided, the automotive vehicle comprising an impact detecting unit for detecting an impact applied to a front pillar and a mechanism for forcibly moving the front door toward the outside of the automotive vehicle on a side thereof where the door lock mechanism is provided based on a detection signal from the impact detection unit, whereby the front door is constructed to be moved toward the outside of the automotive vehicle.

The front door is moved toward the outside of the vehicle by providing the door lock mechanism at the other end of the front door having the hinge provided at one end thereof, providing the impact detecting unit and the moving mechanism on the automotive vehicle in which the door lock mechanism can forcibly be moved toward the outside thereof, detecting an impact applied to the front pillar with the impact detecting unit and forcibly moving the front door toward the outside of the vehicle with the moving mechanism based on the detection signal from the impact detecting unit.

As a result of this, in the event that an impact is applied to the front pillar, the front door can forcibly be moved toward the outside of the vehicle, whereby the risk of the front pillar interfering with the front door can be prevented.

Consequently, since there is no risk of the deformation of the front pillar being prevented, the impact applied to the front pillar can effectively absorbed and reduced.

According to a third aspect of the invention, there is provided an automotive front door window glass lowering structure for an automotive vehicle in which a window glass of a window frame-less front door can forcibly be lowered, the automotive vehicle comprising an impact detecting unit for detecting an impact applied to a front pillar and a lowering mechanism for forcibly lowering the window glass based on a detection signal from the impact detecting unit.

The front door window glass is forcibly lowered with the lowering mechanism based on the detection signal from the impact detecting unit by providing the impact detecting unit and the lowering mechanism on the automotive vehicle in which the door glass of the frame-less front door can forcibly be lowered.

As a result of this, in the event that an impact is applied to the front pillar, the front door window glass can forcibly be lowered, whereby the risk of the front pillar interfering with the front door can be prevented.

Consequently, since there is no risk of the deformation of the front pillar being prevented, the impact applied to the front pillar can effectively absorbed and reduced.

BRIEF DESCRIPTION OF THE DRAWINGS

FIG. 2 shows a cross-sectional view taken along the line 2—2 in FIG. 1;

FIG. 3 shows a cross-sectional view taken along the line 3—3 in FIG. 1 (a cross-sectional view showing a front door moving structure (a first embodiment) of the invention);

FIG. 10 shows a second operation diagram explaining the operation of the front door moving structure (the second embodiment) of the invention;

FIG. 15 shows a first operation diagram explaining the operation of a window glass lowering structure (a third embodiment) of the invention;

DETAILED DESCRIPTION OF THE PREFERRED EMBODIMENTS

Figure 1:
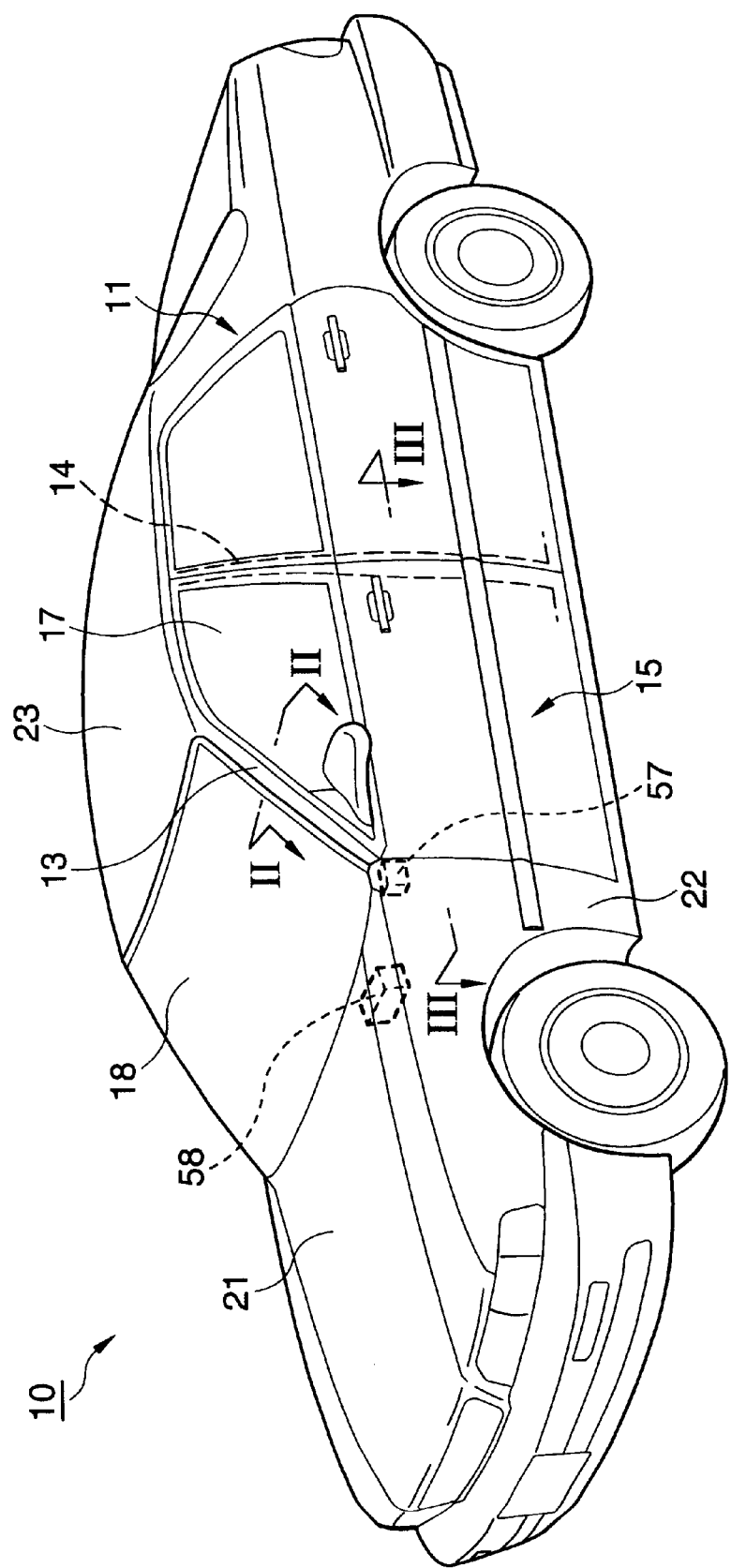
FIG. 1 shows a perspective view of an automotive vehicle according to the invention.

Referring to the accompanying drawings, embodiments of the invention will be described below. Note that the drawings should be viewed in a direction in which reference numerals are oriented.

FIG. 1 is a perspective view showing an automotive vehicle to which the invention is applied. An automotive vehicle 10 comprises a front pillars 13 and a center pillar 14 which constitute a side body 11 (an opposite side body is omitted) and a front door 15 mounted on the front pillar 13 so as to be opened and/or closed and constructed to be locked to the center pillar 14 in such a manner as not to be opened when closed. Additionally, reference numeral 17 denotes a window glass of the front door 15, reference numeral 18 a windshield, reference numeral 21 a hood, and reference numeral 23 a roof panel.

FIG. 2 is a cross-sectional view, taken along the line 2—2 in FIG. 1, of the front pillar.

The front pillar 13 comprises a pillar frame 31 which constitutes a frame for the front pillar 13, a reinforcement member 32 attached to the pillar frame 31, an inner panel 33 attached to the reinforcement member 32, a outer panel 34 which is joined to the inner panel 33 to form a tube, an impact absorbing member 35 attached to a front face 34a of the outer panel 34, a cover member 36 attached to a distal end portion of the impact absorbing member 35 and a pillar garnish 37 adapted to cover a passenger compartment side of the inner panel 33.

The pillar frame 31, reinforcement member 32, inner panel 33 and outer panel 34 constitute a pillar main body 38.

Here, reference numeral 42 denotes a window frame for the front door 15, reference numerals 43, 44, 45, 46 denote weatherstrips, reference numeral 47 a sealant, reference numeral 48 a snap, and reference numeral 49 a molding.

The reinforcement member 32 is a steel sheet member for reinforcing the inner panel 33, and flange portions 33a, 33b are formed at ends thereof and a brittle portion 33c is provided at a central portion of the inner panel 33 for promoting deformation due to an external force.

The outer panel 34 is a folded member of steel, in which a front face 34a which is substantially parallel with the windshield 18 is folded so as to be substantially parallel with the window glass 17 to thereby form an external side face 34b. The external side face 34b is then folded toward a passenger compartment R side to thereby form a rear face 34c. To promote deformation due to an external force, a brittle portion 34d is formed in the rear face 34c. The rear face 34c is made to face the window frame 42 of the front door 15. Flange portions 34e, 34f are formed on ends of the outer panel 34 so as to be welded to the flange portions 33a, 33b of the inner panel 33.

The impact absorbing member 35 is an extruded member of resin, which is easily deformed by an impact from the front of the vehicle to thereby absorb the impact.

An opposite front pillar to the front pillar 13 shown in FIG. 1 is symmetrical with the front pillar 13 and is similar in construction to the front pillar 13 except that they are reversed transversely in construction. The opposite front pillar also functions identically with the front pillar 13, and therefore, a description thereof will be omitted here.

In first and second embodiments of the invention described below, when a large magnitude of external force (in particular, external forces directed rearward, rearward but diagonally downward and downward relative to the vehicle body) acts on the front pillar 13 to thereby deform the shock absorbing member 35 and the pillar main body 38, in order to prevent the ineffective operation of the shock absorbing member 35 due to interruption in deformation of the shock absorbing member 35 and the pillar main body 38 through interference hereof with the front door 15, the front door 15, or more particularly, the window frame 42 and the window glass 17 are moved, by a predetermined distance, toward the outside of the automotive vehicle, or in the transverse direction of the vehicle body. The structure will be described in detail below.

FIG. 3 is a cross-sectional view taken along the line 3—3 in FIG. 1, showing a front door moving structure (a first embodiment) according to the invention, in which a door moving mechanism 52 for moving the front door 15 in a transverse direction of the vehicle body is shown as being provided on a front pillar lower 51 which is formed integrally with the front pillar (refer to FIG. 1). Note that reference numeral 54 denotes a striker mounted on the center pillar 14 and reference numeral 55 a door locking mechanism for connecting to the striker 54 so as to lock the front door to a closed condition.

Here, the positions in cross section of the window frame 42 and the window glass 17 of the front door 15 are originally different from those of the front pillar lower 51, the door moving mechanism 52, the striker 54 and the door locking mechanism 55, but they are now shown on the same cross section for the convenience of description.

The door moving mechanism 52 comprises an acceleration sensor 57 functioning as the impact detecting unit for detecting an impact generated when an object comes to collide against the front pillar 13 (refer to FIG. 1), a control unit 58 for receiving an acceleration signal AS as a detection signal from the acceleration sensor 57, a driving unit 61 adapted to be activated by a driving signal DS from the control unit 58 and a stationary stopper 63 and a door hinge 64 which are adapted to hold therebetween a movable stopper 62 constituting the driving unit 61.

The door hinge 64 comprises a V-shaped movable piece 64a and a stationary piece 64c mounted on the movable piece 64a with a swing shaft 64b in such a manner as to freely swing therearound.

The movable piece 64a is mounted on a support shaft 65 mounted in turn on the front pillar lower 51 in such a manner as to swing thereabound with one end 64d thereof being applied to the movable stopper 62 and the other end 64e being pressed on a side face thereof with the elastic force of a coil spring 67 via a spring receiving portion 66 so as to swing clockwise. Note that reference numeral 68 denotes a spring receiving portion mounted on the front pillar lower 51.

The stationary piece 64c is mounted on the front part of the front door 15.

The stationary stopper 63 is mounted on the front pillar lower 51.

The acceleration sensor 57 is mounted at a position on the front pillar 13 (refer to FIG. 1) which facilitates the detection of vibrations such as on the front pillar lower 51.

The control unit 58 is mounted, for example, on an instrument panel lower within a passenger compartment R.

The driving unit 61 comprises a cylinder 73, a piston 74 which is movably inserted into the cylinder 73, a wire 75 for connecting the movable stopper 62 to the piston 74, and an inflator 77 for blowing combustion gas into a rear air chamber S2 of front and rear air chambers S1, S2 separated by the piston 74 within the cylinder 73 via a pipe 76 based on a signal from the control unit 58.

The operation of the door moving structure described above will be described below.

Figure 4A:
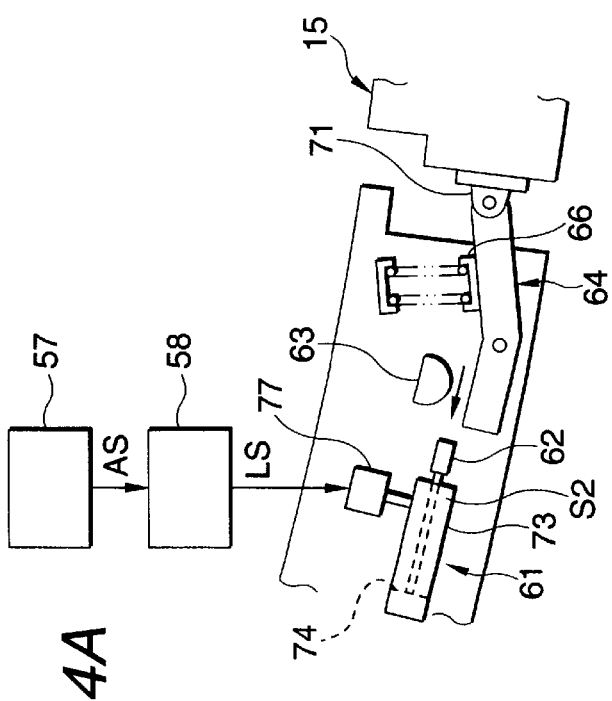
FIG. 4 shows an operation diagram showing the operation of a door moving mechanism of the front door moving structure (the first embodiment) of the invention.
Figure 4B:
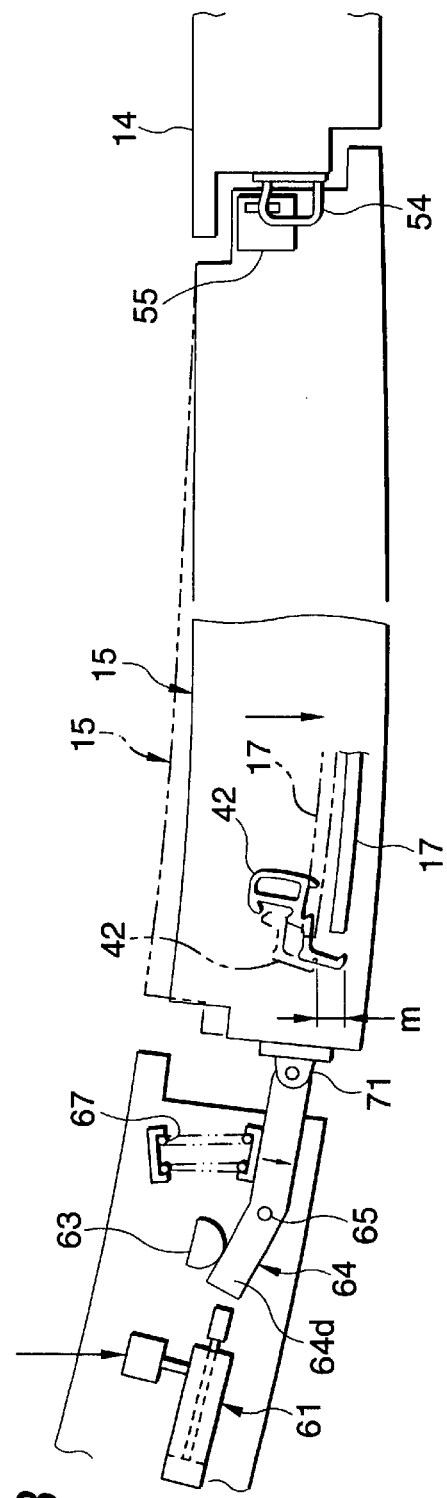

FIGS. 4A, 4B are operation diagrams describing the operation of the door moving mechanism of the front door moving structure (the first embodiment) according to the invention.

In FIG. 4A, when the acceleration sensor 57 detects an impact generated when an object collides against the front pillar 13 (refer to FIG. 1), the acceleration sensor 57 sends an acceleration signal AS to the control unit 58.

The control unit 58 sends an ignition signal LS to the inflator 77 based on the acceleration signal AS from the acceleration sensor 57.

The inflator 77 is then ignited for combustion and supplies combustion gas into the rear air chamber S2 of the cylinder 73 of the driving unit 61 within a moment.

Thus, since the volume within the rear air chamber S2 expands, the piston 74 moves leftward in the figure to thereby pull the movable stopper 62 in a direction indicated by an arrow from between the door hinge 64 and the stationary stopper 63.

In FIG. 4B, the door hinge 64 swings momentarily clockwise by virtue of the elastic force of the coil spring 67, and when one end 64d of the door hinge 64 comes into collision against the stationary stopper 63, the door hinge 64 stops swinging, the front door 15 moving transversely of the vehicle body as indicated by an arrow.

In conjunction with this, the window frame 42 and the window glass 17 of the front door move transversely of the vehicle body, by a distance m, from an imaginary line position to a solid line position.

Next, the shock absorbing operation of the front pillar 13 will be described.

Figure 5A:
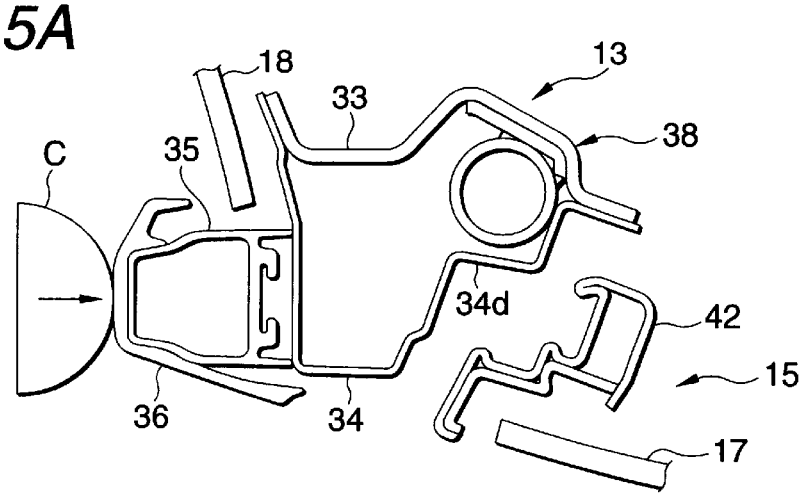
FIG. 5 shows an operation diagram explaining an operation for absorbing an impact applied to a front pillar in accordance with the invention.
Figure 5B:
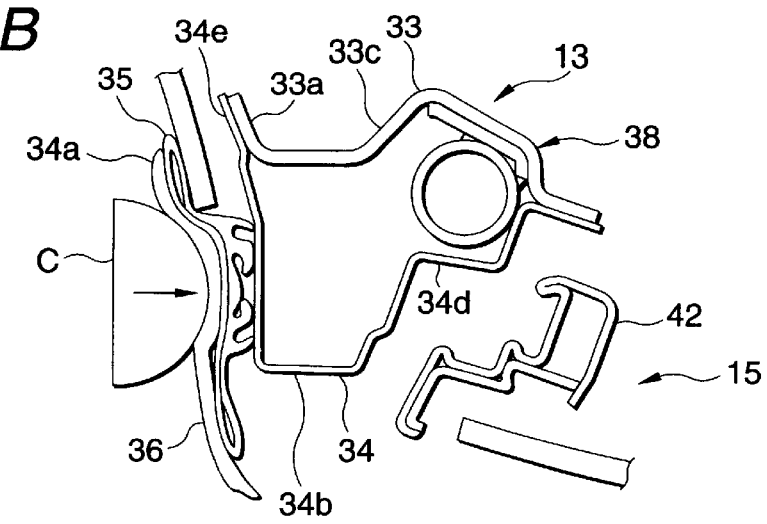
Figure 5C:
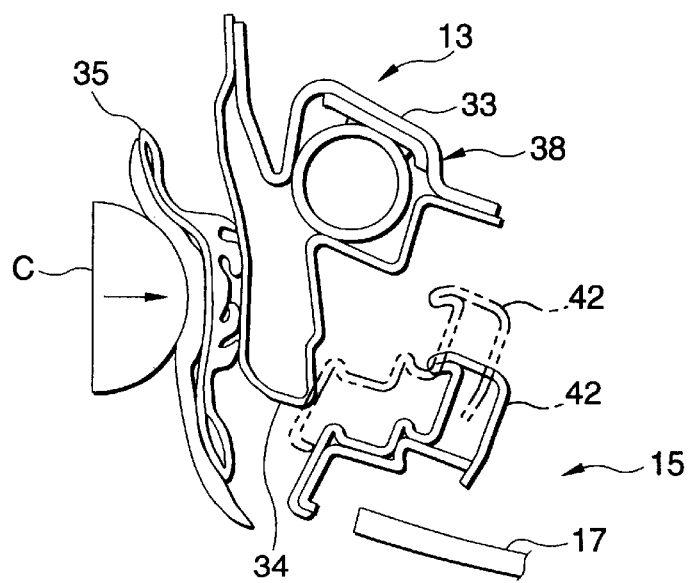

FIGS. 5A to 5C are operation diagrams describing the shock absorbing operations of the front pillar according to the invention.

In FIG. 5A, when an object comes to collide against the front pillar 13 from the front of the vehicle, as shown in FIG. 5B, an impact force is exerted on the shock absorbing member 35, and the shock absorbing member 35 is then easily deformed, whereby part of the impact force so exerted is absorbed.

Next, the brittle portion 33c of the inner panel 33 and the brittle portion 34d of the outer panel 34 start to be deformed by the impact force acting on the pillar main body 38 from the impact absorbing member 35, or by an external force acting on the front face 34a of the outer panel 34 in a rearward direction, and when this occurs, in FIG. 5C, the window frame 42 of the front door 15 has then moved transversely of the vehicle body from the imaginary line position to the solid line position by virtue of the action of the driving unit 61 (refer to FIG. 4), as shown in FIG. 4.

As the inner panel 33 and the outer panel 34 continue to be deformed, although the outer panel 34 moves rearward of the vehicle body, since the window frame 42 of the front door 15 has moved transversely of the vehicle body, there is no risk of the outer panel 34 interfering with the window frame 42.

Consequently, since the outer panel 34 continues to be deformed smoothly, the impact received by the front pillar 13 can effectively be absorbed.

As has been described above with respect to FIGS. 3 and 5, the front door is constructed to be moved transversely outwardly by providing the acceleration sensor 57 for detecting an impact applied to the front pillar 13 (refer to FIG. 1) and the door moving mechanism 52 for forcibly moving the door hinge 64 transversely outwardly of the vehicle body based on the acceleration signal AS from the acceleration sensor 57 on the vehicle 10 (refer to FIG. 1) in which the door hinge 64 of the front door 15 can forcibly be moved transversely outwardly of the vehicle body.

According to the above structure, in a case where an impact is applied to the front pillar 13, the front door 15 can forcibly be moved transversely outwardly of the vehicle body on the side of the front door 15 where the door hinge 64 is provided, and in a case where the door hinge 64 is disposed in the vicinity of the front pillar 13, the movement of the front door 15 transversely outwardly of the vehicle body can be made large, whereby the risk of the front pillar 13 interfering with the front door 15 can positively be prevented.

Thus, since there is no risk of the deformation of the front pillar 13 being interrupted, the impact on the front pillar 13 can effectively be absorbed and reduced.

Figure 6:
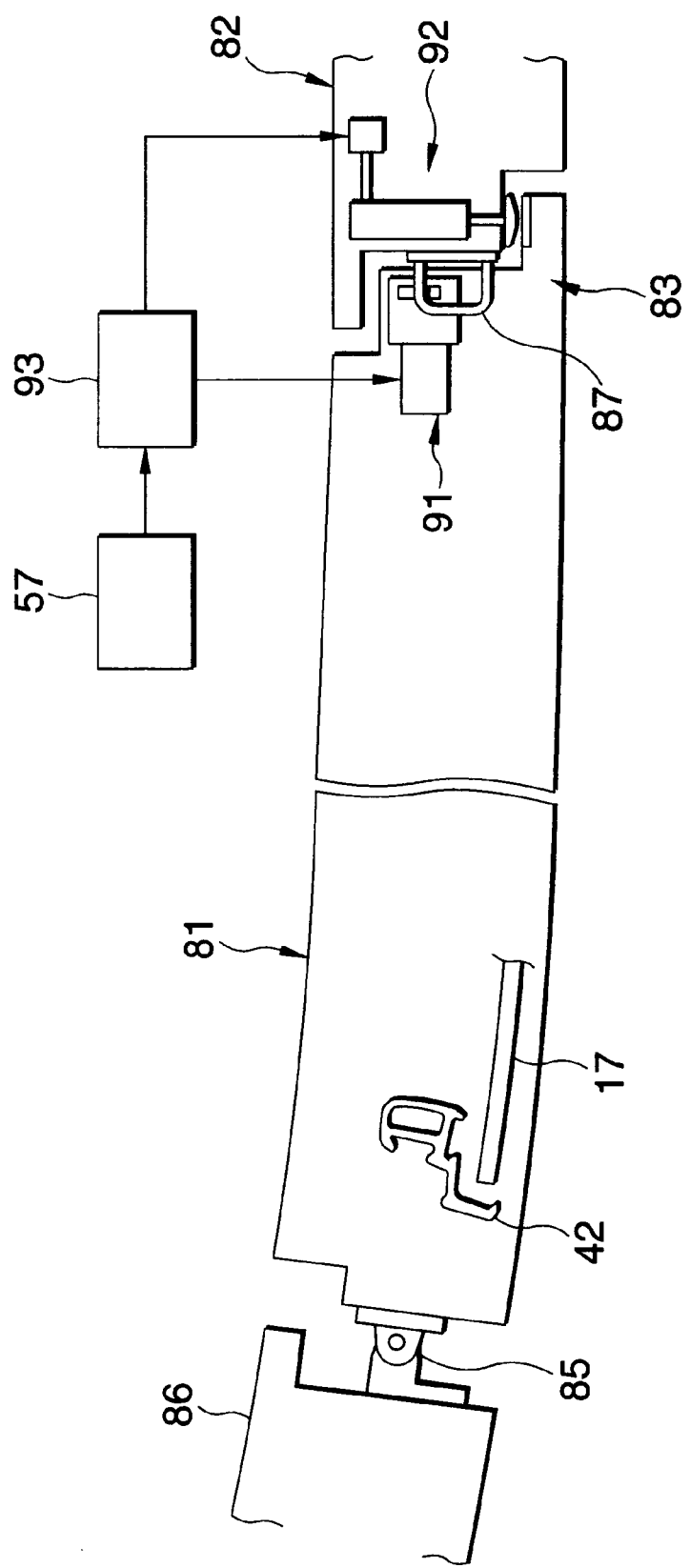
FIG. 6 shows a cross-sectional view showing another front door moving structure (a second embodiment) of the invention.

FIG. 6 is a cross-sectional view showing a front door moving structure (a second embodiment) according to the invention and shows cross sections of a front pillar lower, a front door and a center pillar taken along the same certain horizontal line extending through the components. Shown as being provided at a connecting portion between the front door 81 and the center pillar 82 is a door moving mechanism 83 as a moving mechanism for moving the front door 81 transversely of the vehicle body. Note that reference numeral 85 denotes a hinge mounted on a front part of the front door 81 and a rear part of the front pillar lower 86 and reference numeral 87 denotes a striker mounted on the center pillar.

Figure 7:
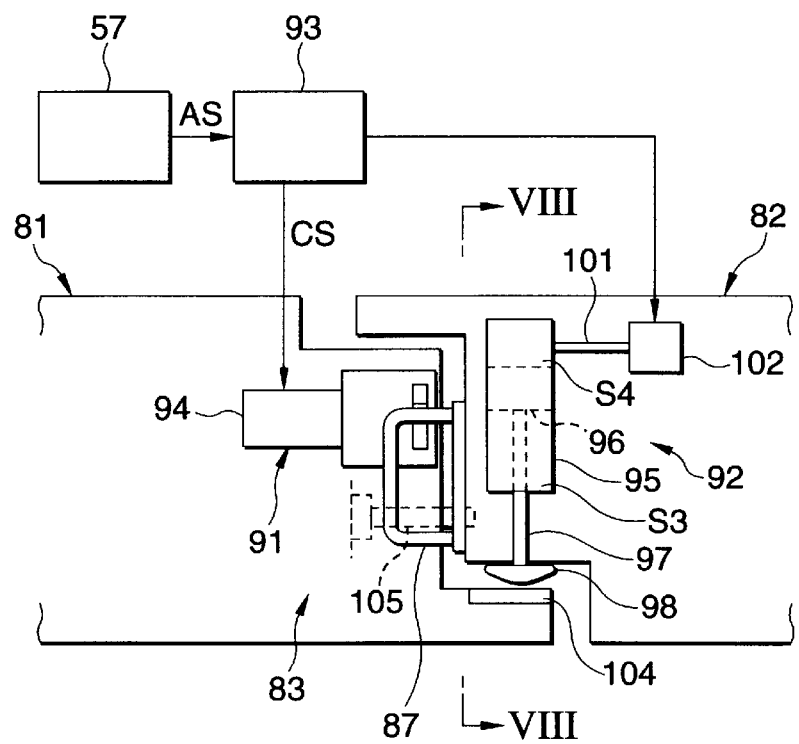
FIG. 7 shows an enlarged view showing a main part of the front door moving structure (the second embodiment) of the invention.

FIG. 7 is an enlarged view of a main part of the front door moving structure (the second embodiment) according to the invention, and the door moving mechanism 83 comprises a door locking mechanism 91 connected to the striker 87 and mounted on the front door 81 for locking the front door 81 to a closed condition, a door pushing mechanism 92 for pushing the front door 81 transversely outwardly, a door position control mechanism (not shown, but will be described later) for stopping the front door 81 when the front door 81 is opened to a predetermined position, an acceleration sensor 57, and a control unit 93 for releasing the door locking mechanism 91 from a locked condition when receiving an acceleration signal AS from the acceleration sensor 57 and activating the door pushing mechanism 92.

The door locking mechanism 91 comprises a solenoid 94 for releasing the lock by a control signal CS from the control unit 93.

The door pushing mechanism 92 comprises a cylinder 95, a piston 96 movably inserted in the cylinder 95, a piston rod 97 attached to the piston 96, a pushing piece 98 attached to a distal end of the piston rod 97 and an inflator 102 connected via a pipe 101 to a second air chamber S4 of air chambers S3, S4 which result when dividing into two halves the interior of the cylinder 95 by the piston 96 inserted therein.

Here, reference numeral 104 denotes a pressure receiving unit provided at an end of the front door 81 for receiving the pushing piece 98 of the door pushing mechanism 92. Reference numeral 105 denotes a connecting pin constituting the door position control mechanism, which is mounted on the front door 81 in such a manner as to project toward the center pillar 82 side.

Figure 8:
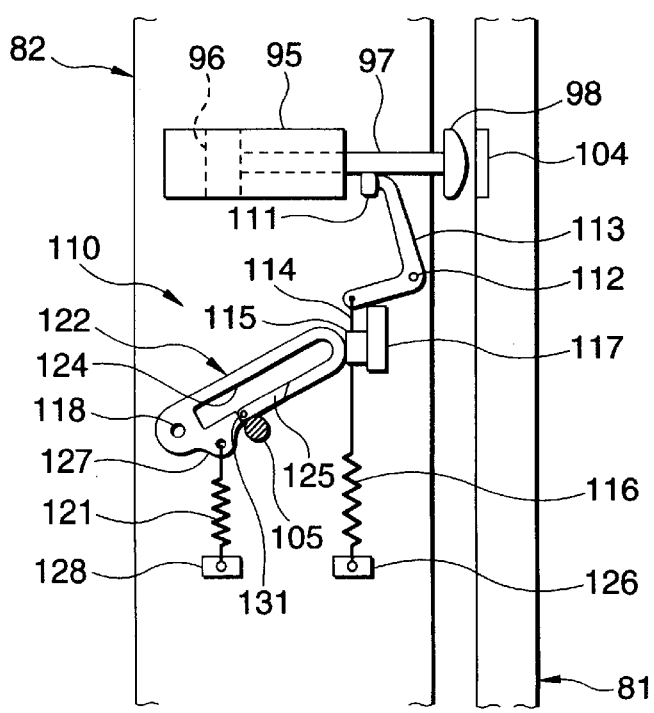
FIG. 8 shows a cross-sectional view taken along the line 8—8 in FIG. 7.

FIG. 8 is a cross-sectional view taken along the line 8—8 in FIG. 7, and the door position control mechanism 110 comprises a projecting piece 111 mounted on a central portion of the piston rod 97, an L-shaped arm 113 applied to the projecting piece 111 at one end thereof and mounted on a first support shaft 112 provided on the center pillar 82 in such a manner as to freely swing on the first support shaft 112, a movable stopper 115 mounted on the other end of the L-shaped arm 113 via a wire 114, a pull spring 116 for pulling down the movable stopper 115, a stationary stopper 117 located adjacent to the movable stopper 115 and mounted on the center pillar 82, a hook member 122 mounted on a second support shaft 121 provided on the center pillar in such a manner as to swing on the second support shaft 121 and applied to the movable stopper 115 at a distal end thereof by allowing a tensile spring 121 to pull down a portion in the vicinity of the second support shaft 118 and the aforesaid connecting pin 105.

The L-shaped arm 113 is a member adapted to interlock with the piston rod 97 for pulling the movable stopper 115 from between the stationary stopper 117 and the distal end of the hook member 122.

The hook member 122 comprises a elongated hole 124 through which the hook member 122 is connected to the connecting pin 105 and a closing portion 125 kept in a closed condition by virtue of a spring force from a spring, not shown, to keep the connecting pin 105 engaged within the elongated hole 124 once the connecting pin 105 is introduced there into. Note that reference numeral 126 denotes a one end fixed portion of the tension spring 116, reference numeral 127 a one end fixed portion of a tension spring 121 on a hook member 122 side, reference numeral 128 the other end fixed portion of the tension spring 121, and reference numeral 131 a swing shaft of the closing portion 125.

Next, the operation of the aforesaid front door moving structure (the second embodiment) according to the invention will be described below.

Figure 9:
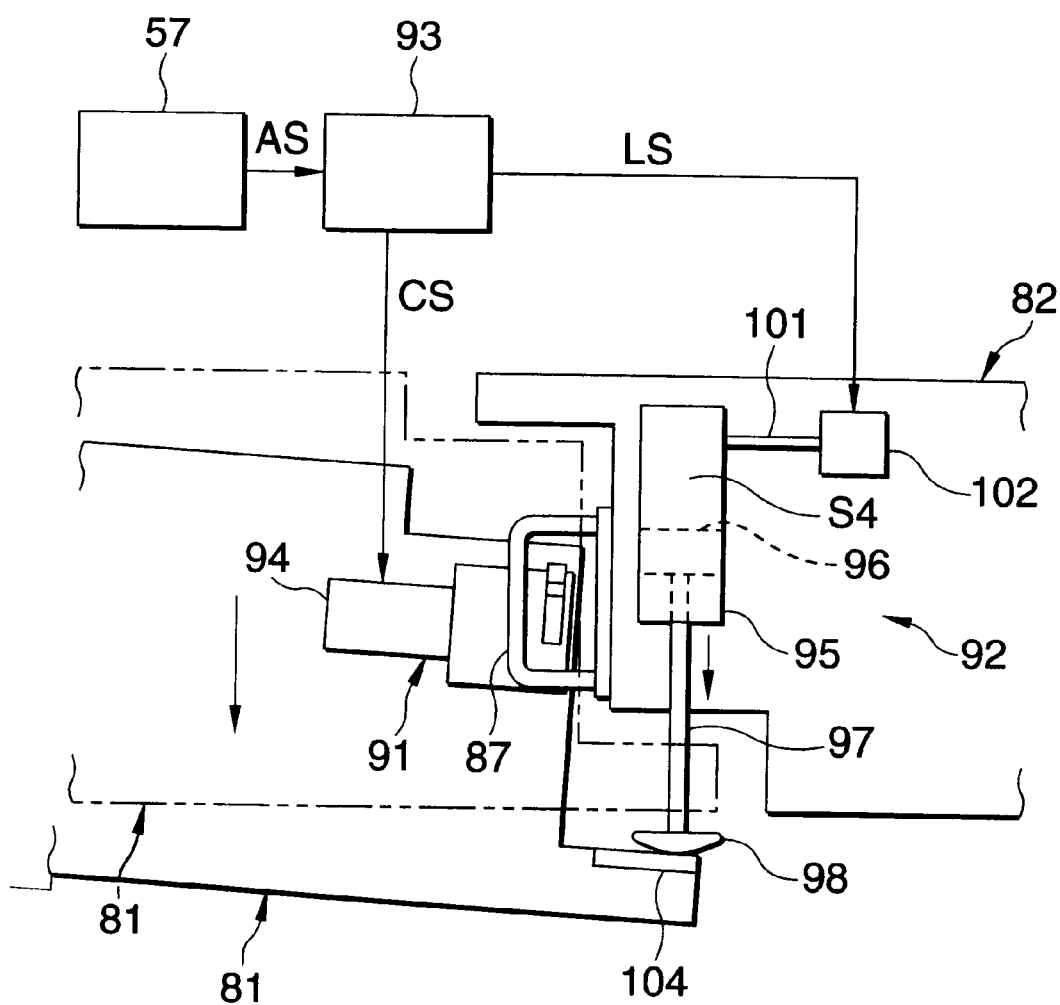
FIG. 9 shows a first operation diagram explaining the operation of another front door moving structure (a second embodiment) of the invention.

FIG. 9 is a first operation diagram explaining the operation of the front door moving structure (the second embodiment) according to the invention.

When the acceleration sensor 57 detects an impact generated when an object comes to collide against the front pillar (refer to FIG. 1), the acceleration sensor 57 sends an acceleration signal AS to the control unit 93.

The control unit 93 first sends a control signal CS to a solenoid 94 of the door locking mechanism 91 based on an acceleration signal AS from the acceleration signal sensor 57.

The solenoid 94 releases the door locking mechanism 91 from the locked condition by the control signal CS so sent to the solenoid 94, whereby the connection between the door locking mechanism 91 and the striker 87 is disengaged.

Next, the control unit 93 sends an ignition signal LS to the inflator 102 of the door pushing mechanism 92.

The inflator 102 is then ignited by the signal for combustion, and combustion gas is momentarily supplied to the second air chamber S4 in the cylinder 95 via a pipe. Then, the second air chamber S4 expands due to a pressure of the combustion gas so generated, moves the piston 96 downward as seen in the figure, causes the piston rod 97 to project and allows the pushing piece 98 to push the pressure receiving portion 104.

FIGS. 10A, 10B are second operation diagrams explaining the operation of the front door moving structure (the second embodiment) according to the invention.

In FIG. 10A, when the piston rod 97 projects from the cylinder 96, in conjunction with the movement of the projecting piece 111 the L-shaped arm 113 swings clockwise around the first support shaft 112 and the movable stopper 115 rises. When this occurs, there exist no more stopper for the hook member 122, whereby the hook member 122 swings clockwise around the second support shaft 118 by virtue of the tension of the tension spring 121 from an imaginary line position to a solid line position, during which the closing portion 125 of the hook member 122 opens, whereby the connecting pin 105 is allowed to enter the elongated hole 124 in the hook member 122.

Thereafter, since the closing portion 125 closes, there is no risk of the connecting pin 105 disengaging from the hook member 122.

In FIG. 10B, as the piston rod 97 projects further from the cylinder 95, in conjunction with this, the connecting pin 105 fixed to the front door 81 moves transversely of the vehicle body and stops when the connecting pin 105 comes into abutment with the end of the elongated hole 124. Namely, the movement of the front door 81 stops and the door will not open any further.

Figure 11:
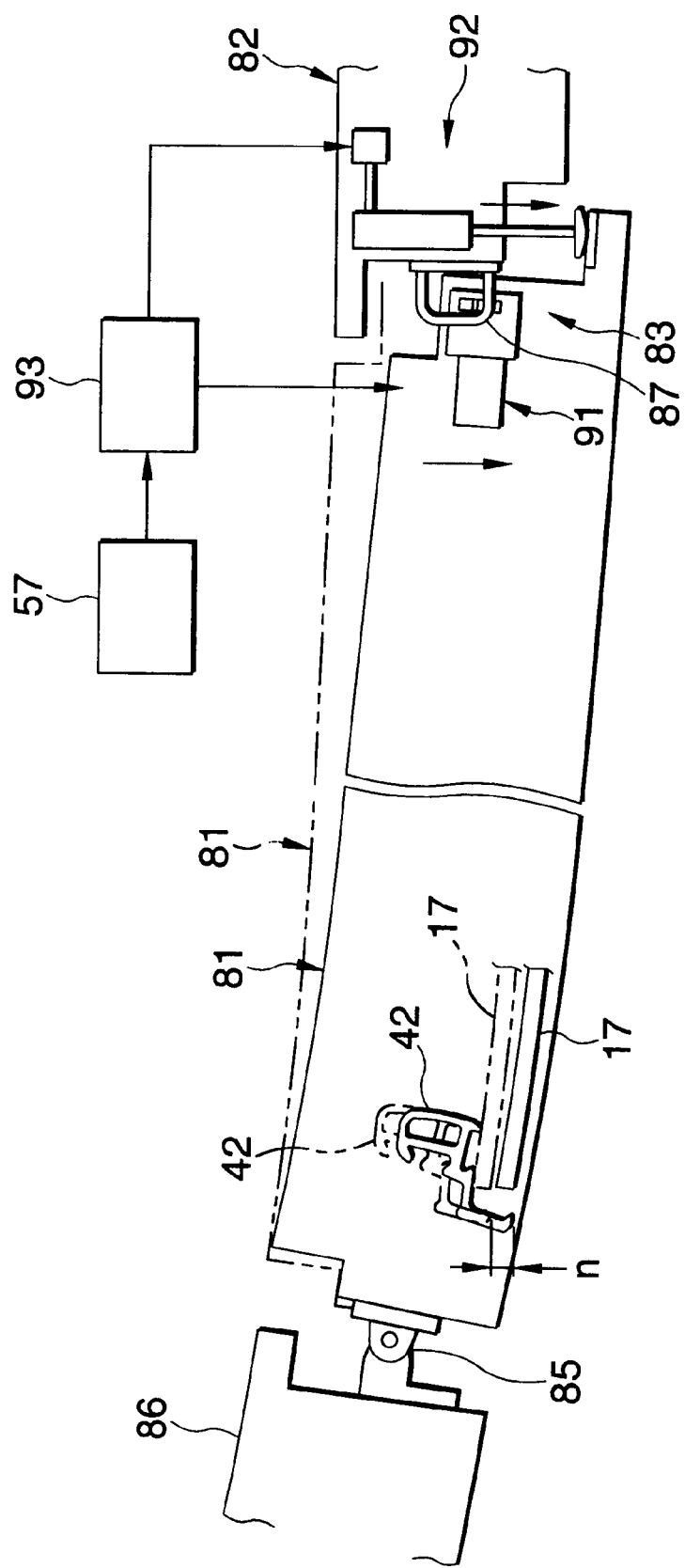
FIG. 11 shows a third operation diagram explaining the operation of the front door moving structure (the third embodiment) of the invention.

FIG. 11 is a third operation diagram explaining the operation of the front door moving structure (the second embodiment) according to the invention.

When the hook member 22 (refer to FIG. 10B) connects to the connecting pin 105 (refer to FIG. 10B), the rear part of the front door 81 stops after it has moved, by a predetermined distance, and in conjunction with this, a window frame 42 and a window glass of the front door 81 move, by a distance n, transversely of the vehicle body from a imaginary line position to a solid line position.

As has been described heretofore, the invention is characterized by the structure for moving the front door 81 transversely outwardly for an automotive vehicle in which the hinge 85 is provided at one end of the front door 81, while the door locking mechanism 91 for connecting the front door 81 to the vehicle side is provided at the other end of the front door 81, whereby the door locking mechanism 91 can forcibly be moved transversely outwardly of the vehicle body, wherein the automotive vehicle comprises the acceleration sensor 57 for detecting an impact applied to the front pillar (refer to FIG. 1), and the door moving mechanism 83 for forcibly moving the front door on the side where the door locking mechanism 91 is provided transversely outwardly of the vehicle body based on the acceleration signal AS (refer to FIG. 7) from the acceleration sensor 57.

According to the above structure, in a case where an impact is applied to the front pillar 13, the front door 81 can forcibly be moved transversely outwardly of the vehicle, whereby the interference of the front pillar 13 with the front door 81 can be prevented.

Consequently, since there is no risk of the deformation of the front pillar 13 being prevented, the impact acting on the front pillar 13 can effectively be absorbed and reduced.

A third embodiment described below provides a structure for lowering a window glass, by a predetermined distance, in order to prevent the ineffective operation of the shock absorbing structure for the front pillar 13 that would result when the deformation of the shock absorbing member 35 and the pillar main body 38 shown in FIG. 2 is prevented through the interference thereof with a window glass of a window frame-less front door when the shock absorbing member 35 and the pillar main body 38 are deformed by a large magnitude of external force (in particular, external forces applied to the vehicle body rearward, rearward but diagonally downward and downward) applied to the front pillar 13 facing the window glass of the window frame-less front door. The structure will be described in detail below.

Figure 12:
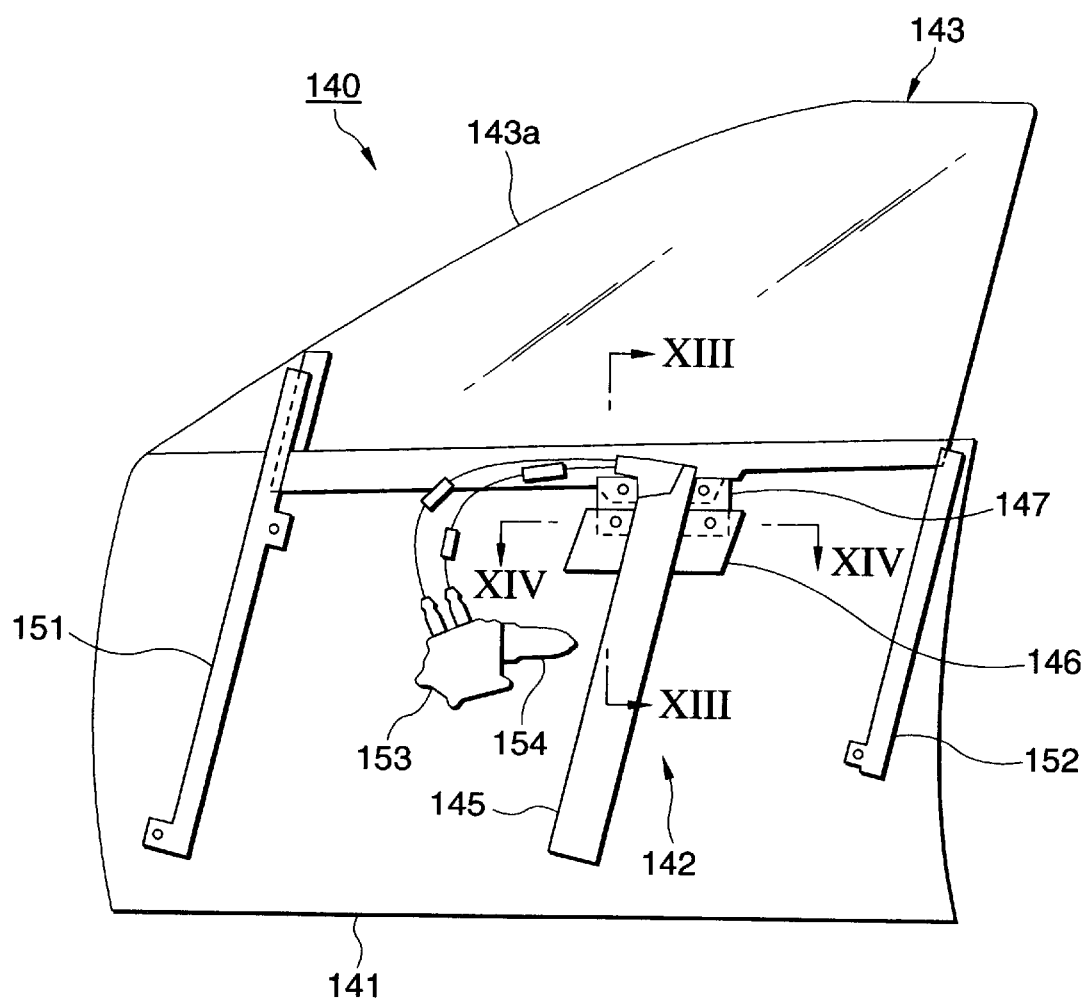
FIG. 12 shows an explanatory diagram showing a window glass lowering structure (a third embodiment) of the invention.

FIG. 12 is an explanatory diagram showing the window glass lowering structure (the third embodiment) according to the invention, and is drawn such that the interior of a window frame-less front door 140 can be seen.

The front door 140 comprises a door panel 141 comprising in turn an outer panel and an inner panel, a powered window device 142 mounted on the door panel 141 and a window glass 143 adapted to be raised and/or lowered by the powered window device 142.

The powered window device 142 comprises a raising/lowering mechanism portion 145 installing therein mechanisms required for raising and/or lowering the window glass, a base portion 146 mounted to the raising/lowering mechanism portion 145 in such a manner as to freely be raised and/or lowered, an intermediate portion 147 mounted on the base portion 146, the aforesaid window glass 143 mounted on the intermediate portion 147, guide members 151, 152 for guiding both side edges of the window glass 143 and a driving portion 153 connected to the raising/lowering mechanism portion 145 for raising and/or lowering the base portion 146. Note that reference numeral 154 denotes an electric motor functioning as a driving source.

Figure 13:
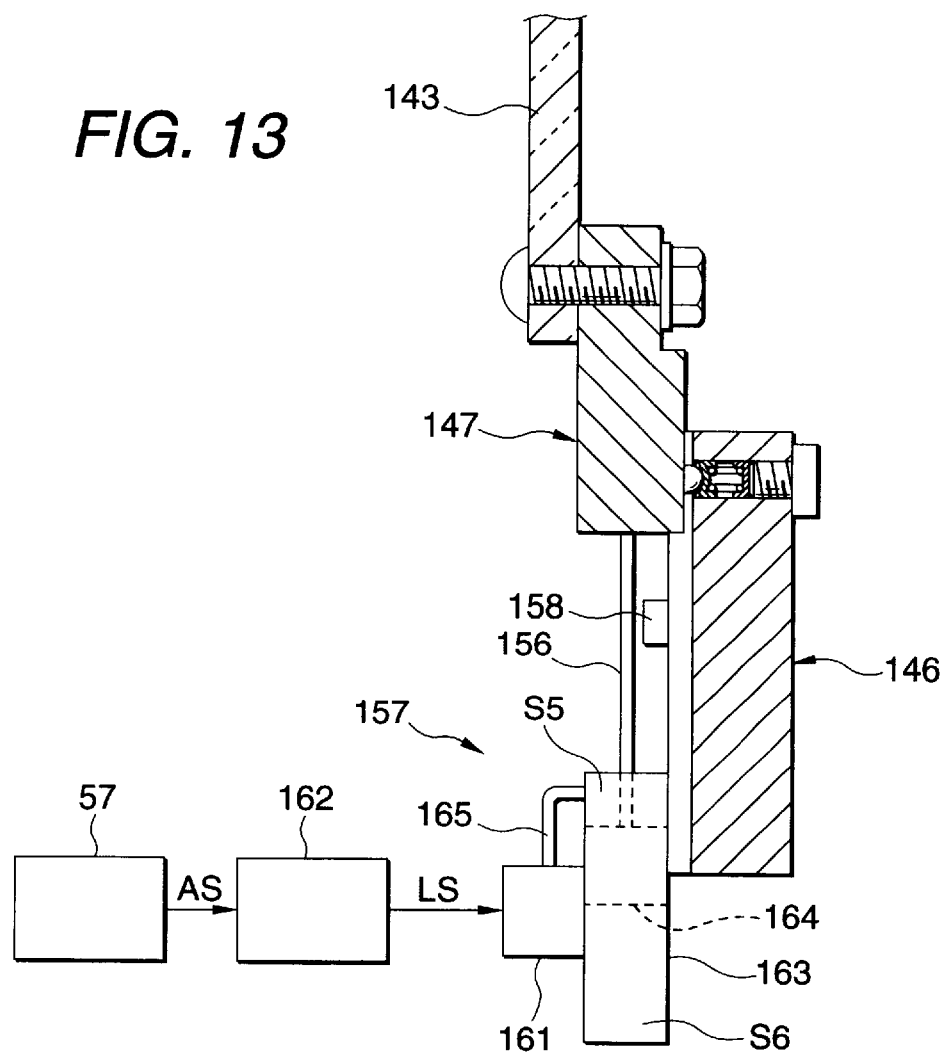
FIG. 13 shows a cross-sectional view taken along the line 13—13 in FIG. 12.

FIG. 13 is a cross-sectional view taken along the line 13—13 in FIG. 12, and the intermediate portion 147 is mounted on the base portion 146 in such a manner as to freely be raised and/or lowered and is connected at a lower end thereof to a window glass lowering mechanism 157 functioning as a lowering mechanism via a wire 156. Note that reference numeral 158 denotes a stopper for the intermediate portion 147 when it is lowered.

The window glass lowering mechanism 157 comprises the acceleration sensor 57, a control unit 162 for sending an ignition signal LS to an inflator 161 by an acceleration signal AS from the acceleration sensor 57, a cylinder for allowing combustion gas generated by the inflator 161 ignited by the ignition signal LS to expand therein, and a piston 164 movably inserted into the cylinder 163 and to which a lower end of the wire 156 is connected. Note that reference characters with numerals S5, S6 denote upper and lower air chambers which are so divided by the piston 164 inserted in the cylinder 163, the upper air chamber S5 being connected to the inflator 161 via a pipe 165.

Figure 14:
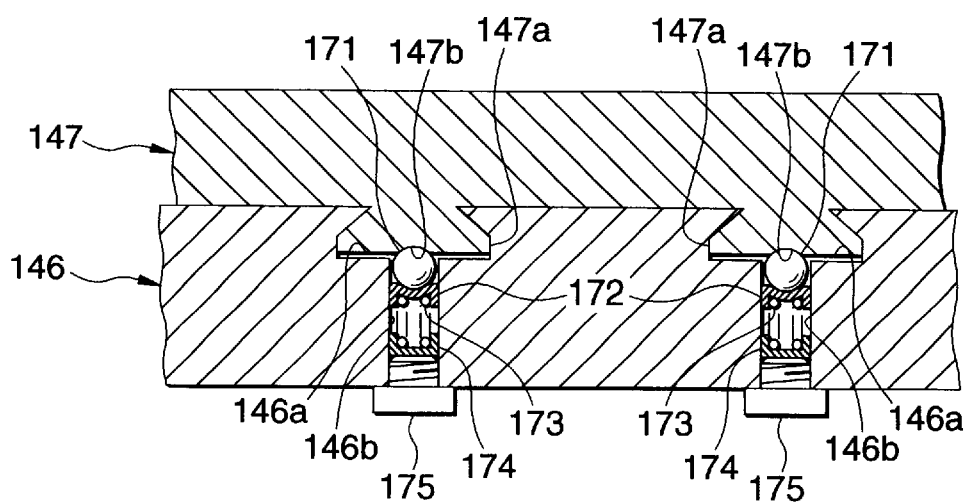
FIG. 14 shows a cross-sectional view taken along the line 14—14 in FIG. 12.

FIG. 14 is a cross-sectional view taken along the line 14—14 in FIG. 12, in which vertical grooves 146a, 146a are formed in the base portion 146, and projections 147a, 147a formed on the intermediate portion 147 are fitted in the vertical grooves 146a, 146a, whereby the intermediate portion 147 is movably mounted on the base portion 146. Additionally, horizontal holes 146b, 146b are formed in a bottom portion of the base portion 146, and spherical depressions 147b, 147b are formed in a distal end face. A steel ball 171, a retainer 172, a coil spring 173 and a retainer 174 are inserted into each of the horizontal holes 146b, 146, in that order. Bolts 175, 175 are then screwed into openings in the horizontal holes 146b, 146b against the elastic force of the coil springs 173, whereby the balls 171, 171 are pushed into the depressions 147b, 147b.

Normally, the base portion 146 and the intermediate portion 147 are made integral with each other in that state, where the window glass 143 are raised and/or lowered by the powered window device 142 (refer to FIG. 12).

Next, the aforesaid window glass lowering structure will be described below.

FIGS. 15A, 15B are first operation diagrams explaining the operation of the window glass lowering structure (the third embodiment) according to the invention.

FIG. 15A shows a normal condition where the window glass lowering mechanism 157 is not in operation, and the base portion 146 and the intermediate portion 147 are being integral with each other via the steel balls 171.

In FIG. 15B, when the acceleration sensor 57 detects an impact generated when an object comes to collide against the front pillar 13 (refer to FIG.1), the acceleration sensor 57 sends an acceleration signal AS to the control unit 162.

The control unit 162 sends an ignition signal LS to the inflator 161 of the window glass lowering mechanism 157 based on the acceleration signal AS from the acceleration sensor 57.

The inflator 161 is then ignited for combustion by the ignition signal LS and combustion gas under high pressure is momentarily supplied into the cylinder 163 via the pipe 165.

This then inflates the upper air chamber S5, and the piston 164 then lowers, whereby the intermediate portion 147 is allowed to lower down to the position of the stopper 158.

As a result of this, the window glass 143 is allowed to lower momentarily.

Figure 16:
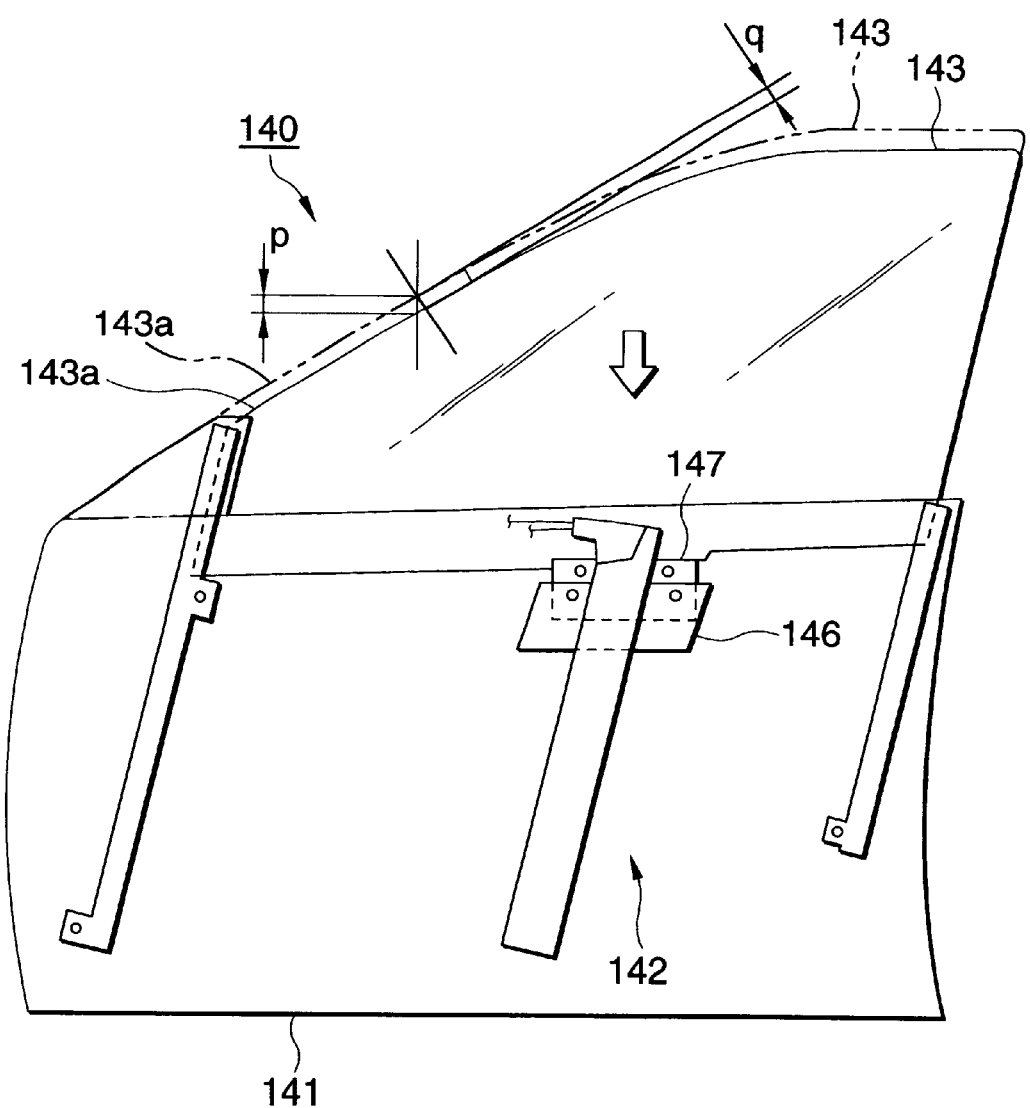
FIG. 16 shows a second operation diagram explaining the operation of a window glass lowering structure (the third embodiment) of the invention.

FIG. 16 is a second operation diagram explaining the operation of the window glass lowering structure (the third embodiment) according to the invention.

That the window glass 143 is lowered, by a distance p, by the window glass lowering mechanism 157 means that an inclined side 143a of the window glass 143 moves apart, by a distance q, from the adjacent front pillar 13 (refer to FIG. 1).

Consequently, even if the front pillar 13 is deformed to absorb the impact, the front pillar 13 does not interfere with the window glass 143.

Figure 17A:
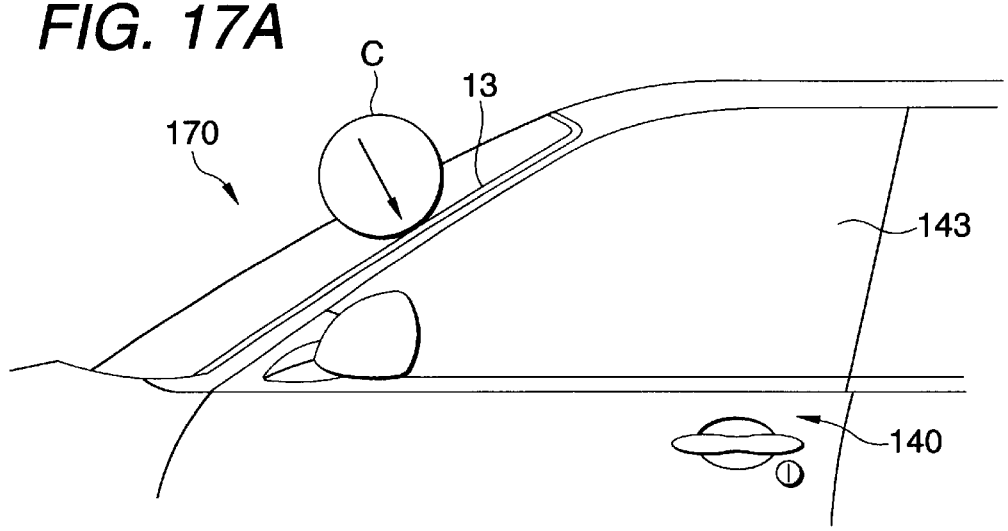
FIG. 17 shows a third operation diagram explaining the operation of a window glass lowering structure (the third embodiment) of the invention.
Figure 17B:
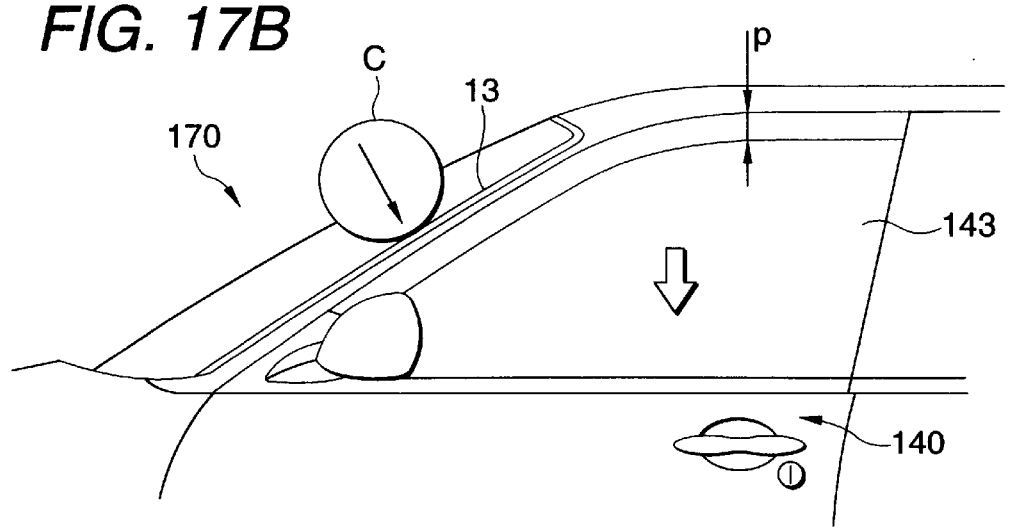
Figure 17C:
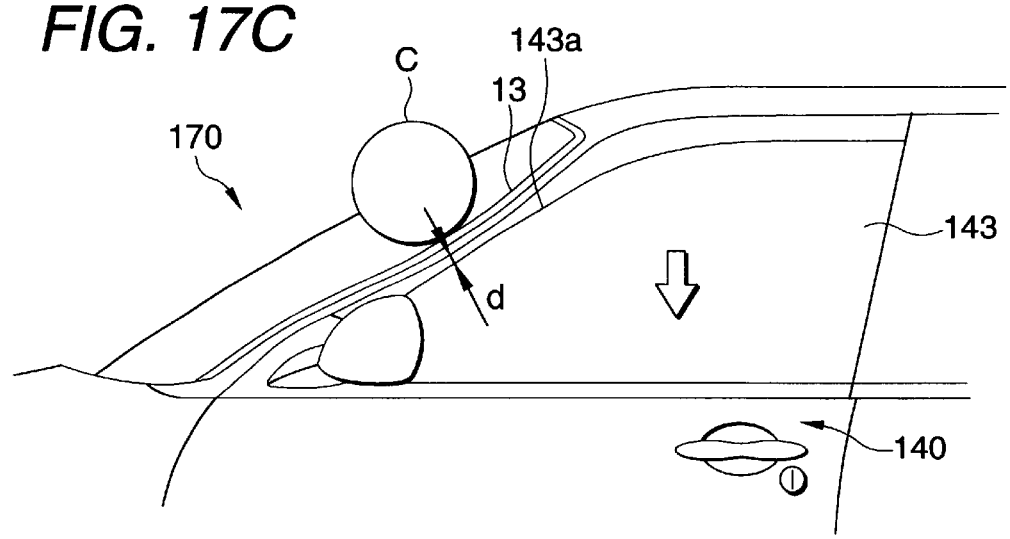
Figure 18:
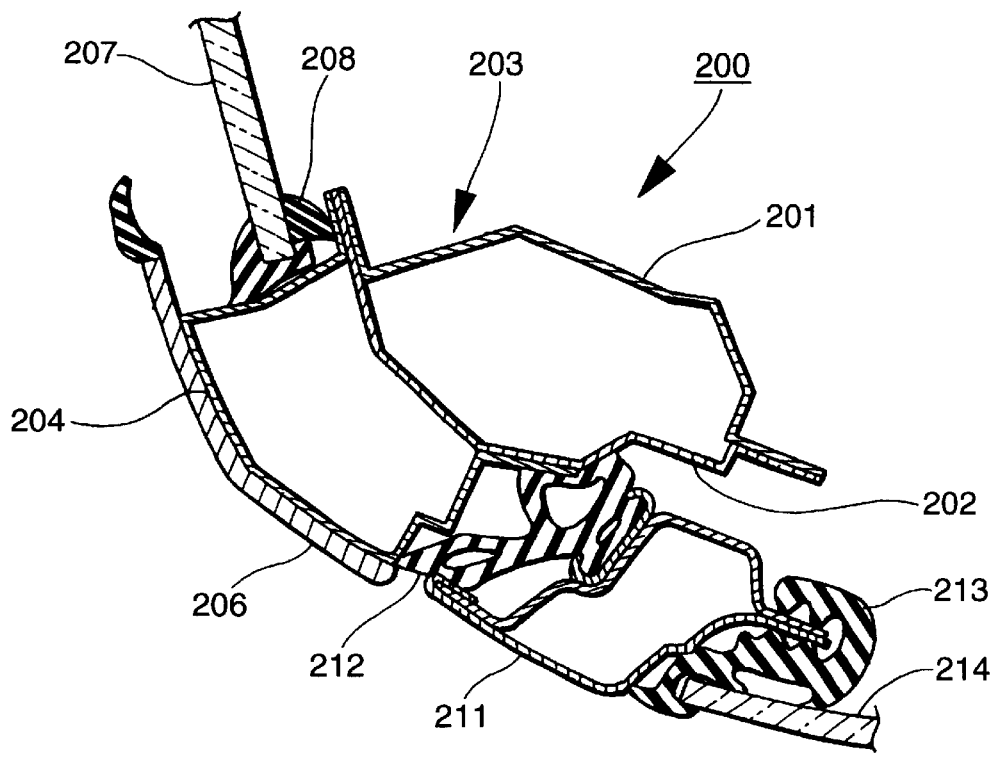
FIG. 18 shows a cross-sectional view showing a conventional front pillar.
Figure 19:
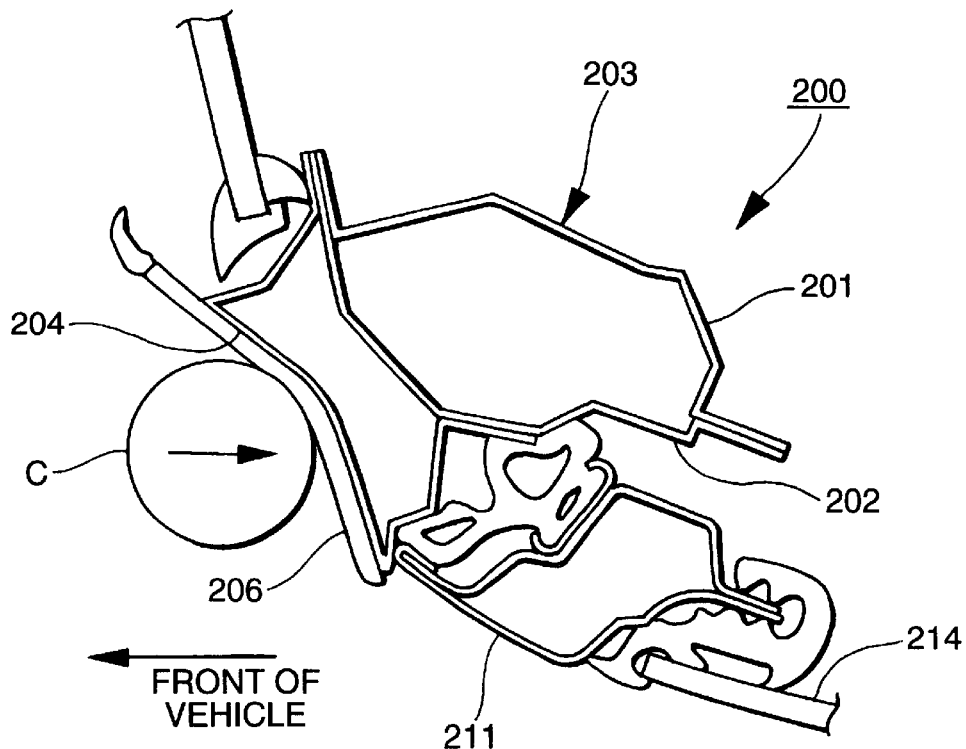
FIG. 19 shows an operation diagram explaining the operation of the conventional front pillar.

FIGS. 17A to 17C are third operation diagrams explaining the operation of the window glass lowering structure (the third embodiment) according to the invention.

In FIG. 17A, when an object C comes into collide against the front pillar 13 of the automotive vehicle 170 provided with the window frame-less front doors, as shown in FIG. 17B, the window glass 143 is lowered by the distance q momentarily by the aforesaid window glass lowering mechanism.

In FIG. 17C, the front pillar 13 starts to be deformed to thereby start to absorb the impact produced by the colliding object C, and finally the deformation stops when the minimum clearance reaches d.

Thus, since the deformation of the front pillar 13 is not prevented by the window glass 143 while the pillar being deformed, the impact applied to the front pillar 13 can sufficiently be absorbed.

As has been described heretofore in FIGS. 13 to 17, the present invention relates to the automotive vehicle in which the window glass 143 of the window frame-less front door 140 can forcibly be lowered, the automotive vehicle 170 comprising the acceleration sensor 57 for detecting the impact applied to the front pillar 13 and the window glass lowering mechanism 157 for forcibly lowering the window glass 143 based on the acceleration signal AS from the acceleration sensor 57.

According to the above construction, in the event that an impact is applied to the front pillar 13, the window glass 143 can forcibly be lowered, whereby the front pillar 13 can be prevented from interfering with the window glass 143.

Consequently, since there is no risk of the window glass 143 preventing the deformation of the front pillar 13, the impact exerted to the front pillar 13 can effectively be absorbed and reduced.

Note that in the case of an automotive vehicle having two door hinges disposed vertically for a single front door, only the upper door hinge may be moved transversely outwardly of the vehicle, so that the window frame of the front door may be moved.

In addition, in the case of the window frame-less front door, a window glass inclining mechanism may be provided in which the upper and inclined sides of the window glass are moved transversely outwardly of the vehicle so that the window glass is inclined, or the window glass is inclined while being lowered, whereby the interference of the front pillar with the window glass can be prevented.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

With the above structures, the invention provides the following advantages.

According the first aspect of the invention, there is provided the front door moving structure for an automotive vehicle or an automotive vehicle having the same, in which the automotive vehicle comprises the impact detecting unit for detecting an impact applied to the front pillar and the moving mechanism for forcibly moving the hinge transversely outwardly of the vehicle based on the detection signal from the impact detecting unit, whereby in the even that an impact is applied to the front pillar, the front door can forcibly be moved transversely outwardly of the vehicle on the side thereof where the door hinge is provided, and moreover, in a case where the door hinge is disposed in the vicinity of the front pillar, the transversely outward movement of the front door can be made large, whereby the interference of the front pillar with the front door can positively be prevented.

Consequently, since the deformation of the front pillar cannot be prevented, the impact applied to the front pillar can effectively be absorbed and reduced.

According to the second aspect of the invention, there is provide the front door moving structure for an automotive vehicle or an automotive vehicle having the same, in which the automotive vehicle comprises the impact detecting unit for detecting an impact applied to the front pillar and the moving mechanism for forcibly moving the front door transversely outwardly of the vehicle on the side thereof where the door hinge is provided, whereby in the even that an impact is applied to the front pillar, the front door can forcibly be moved transversely outwardly of the vehicle, whereby the interference of the front pillar with the front door can positively be prevented.

Consequently, since the deformation of the front pillar cannot be prevented, the impact applied to the front pillar can effectively be absorbed and reduced.

According to the third aspect of the invention, there is provided the window glass lowering structure for the automotive vehicle, or an automotive vehicle having the same, wherein the window glass in the window frame-less front door can forcibly be lowered, in which the automotive vehicle comprises the impact detecting unit for detecting an impact applied to the front pillar and the lowering mechanism for forcibly lowering the window glass based on the detection signal from the impact detecting unit, whereby in the event that an impact is applied to the front pillar, the window glass can forcibly be lowered, therebye liminating a risk of the front pillar interfering with the window glass.

Consequently, since the deformation of the front pillar cannot be prevented, the impact applied to the front pillar can effectively be absorbed and reduced.

What is claimed is:

1. An automotive vehicle comprising:
   a front door openably and closably mounted on a front pillar through a hinge and lockably engaged with a center piller through a door lock mechanism;
   an impact detecting unit for detecting an impact applied to said front pillar; and
   a moving mechanism for forcibly moving said front door toward an non-interference side of said automotive vehicle based on a detection signal from said impact detecting unit, to thereby prevent the deformation of said front pillar from interfering with said front door.

2. The automotive vehicle according to claim 1, wherein said front door comprises a window frame, and said moving mechanism forcibly moves said hinge of said front door toward the outside of said automotive vehicle based on the detection signal from said impact detecting unit, to thereby prevent the deformation of the front pillar from interfering with the window frame of the front door.

3. The automotive vehicle according to claim 2, wherein said hinge is pivotally mounted by a support shaft (65) at the center thereof, and wherein
   said moving mechanism comprises,
   a spring member elastically urging the one end of said hinge toward a direction keeping said front door close,
   a movable stopper engaging with the other end of said hinge and keeping said hinge unrotatable about said support shaft, and
   a driving unit moving said movable stopper in accordance with the detection signal from said impact detecting unit.

4. The automotive vehicle according to claim 3, wherein said driving unit comprises:
   a cylinder;
   a piston movably inserted in said cylinder and coupled with said movable stopper; and
   an inflator driven in accordance with the detection signal from said impact detecting unit, said inflator blowing a gas into an air chamber of said cylinder so as to move said piston within said cylinder.

5. The automotive vehicle according to claim 3, wherein said moving mechanism further comprises:
   a stationary stopper engagable with the other end of said hinge and keeping said hinge unrotatable about said support shaft after said hinge has been rotated by disengaging said movable stopper from the end of said hinge.

6. The automotive vehicle according to claim 1, wherein said non-interference side is the outside of said automotive vehicle.

7. The automotive vehicle according to claim 1, wherein said door moving mechanism comprises:
   a door locking mechanism connectable with a striker and mounted on said front door for locking said front door to closed condition;
   a door pushing mechanism for pushing said front door outwardly;
   a door position control mechanism for stopping said front door when said front door is opened to a predetermined portion; and
   a control unit for releasing the door locking mechanism from a locked condition when receiving the detection signal from said impact detecting unit and activating said door pushing mechanism.

8. The automotive vehicle according to claim 7, wherein said door pushing mechanism comprises:
   a pushing piece for pushing said front door outwardly;
   a cylinder;
   a piston movably inserted in said cylinder and coupled with said pushing piece; and
   an inflator driven in accordance with the detection signal from said impact detecting unit, said inflator blowing a gas into an air chamber of said cylinder so as to move said piston within said cylinder.

9. The automotive vehicle according to claim 1, wherein said non-interference side is a lower side of said automotive vehicle, and said front door comprises a window glass frame-less front door having a window grass, and
   wherein said moving mechanism forcibly moves a window grass of said front door toward the lower side of said automotive vehicle based on the detection signal from said impact detecting unit, to thereby prevent the deformation of the front pillar from interfering with said window grass of said front door.

10. The automotive vehicle according to claim 9, wherein said moving mechanism comprises:
    a base portion on which said window grass is mounted;
    a raising/lowing mechanism portion for raising/lowing said base portion;
    a driving unit lowering said base portion when receiving the detection signal from said impact detecting unit and activating said door pushing mechanism in accordance with the same.

11. The automotive vehicle according to claim 10, wherein said driving unit comprises:
    a cylinder;
    a piston movably inserted in said cylinder and coupled with said base portion; and
    an inflator driven in accordance with the detection signal from said impact detecting unit, said inflator blowing a gas into an air chamber of said cylinder so as to move said piston within said cylinder.

12. An automotive front door moving structure for an automotive vehicle, comprising:

a hinge provided at one end of a front door of said automotive vehicle;

an impact detecting unit for detecting an impact applied to a front pillar of said automotive vehicle; and moving mechanism for forcibly moving said hinge toward the outside of said automotive vehicle based on a detection signal from said impact detecting unit, whereby said front door is constructed to be moved toward the outside of said automotive vehicle.

13. An automotive front door moving structure for an automotive vehicle, comprising:

a hinge provided at one end of a front door of said automotive vehicle;

a door lock mechanism provided at the other end of said front door for connecting said front door to an automotive vehicle side, an impact detecting unit for detecting an impact applied to said front pillar; and moving mechanism for forcibly moving said front door toward the outside of said automotive vehicle on a side thereof where said door lock mechanism is provided, wherein said moving mechanism is operated in accordance with a detection signal from said impact detection unit, whereby said front door is constructed to be moved toward the outside of said automotive vehicle.

* * * * *